US008531616B2

(12) United States Patent  
Shin et al.

(10) Patent No.: US 8,531,616 B2
(45) Date of Patent: Sep. 10, 2013

(54) LIQUID CRYSTAL DISPLAY DEVICE AND METHOD FOR MANUFACTURING THE SAME

(75) Inventors: Hee Sun Shin, Paju (KR); Kum Mi Oh, Seoul (KR); Han Seok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 189 days.

(21) Appl. No.: 13/239,680

(22) Filed: Sep. 22, 2011

(65) Prior Publication Data

US 2012/0127413 A1 May 24, 2012

(30) Foreign Application Priority Data

Nov. 22, 2010 (KR) .................. 10-2010-0116174

(51) Int. Cl.
 *G02F 1/1335* (2006.01)
 *G02F 1/1343* (2006.01)
(52) U.S. Cl.
 USPC .............................. 349/12; 349/139; 349/141
(58) Field of Classification Search
 USPC ........................................ 349/12, 139, 141
 See application file for complete search history.

(56) References Cited

U.S. PATENT DOCUMENTS

| | | | |
|---|---|---|---|
| 7,936,340 B2 * | 5/2011 | Lee et al. ...................... 345/173 |
| 8,174,631 B2 * | 5/2012 | Kim et al. ......................... 349/12 |
| 2001/0007779 A1 | 7/2001 | Lee et al. |
| 2003/0025857 A1 | 2/2003 | Ochiai et al. |
| 2008/0048989 A1 * | 2/2008 | Yoon et al. ..................... 345/173 |
| 2012/0127414 A1 * | 5/2012 | Shin .............................. 349/139 |
| 2012/0133858 A1 * | 5/2012 | Shin et al. ....................... 349/59 |

FOREIGN PATENT DOCUMENTS

| | | |
|---|---|---|
| KR | 2001-0063293 | 7/2001 |
| KR | 2003-0011692 | 2/2003 |
| KR | 10-2005-0121480 | 11/2006 |
| KR | 10-2009-0028627 | 3/2009 |
| WO | 2007/146780 A2 | 12/2007 |

OTHER PUBLICATIONS

Office Action from the Korean Intellectual Property Office dated Jan. 31, 2013 from counterpart application No. 10-2010-0116174.

* cited by examiner

*Primary Examiner* — Mike Qi
(74) *Attorney, Agent, or Firm* — Morgan, Lewis & Bockius LLP

(57) ABSTRACT

An LCD device includes a substrate including an active region and a dummy region; gate and data lines disposed on the substrate crossing each other to define a plurality of pixel regions in the active region; a pixel electrode disposed in each of the plural pixel regions; a common electrode which is patterned in the active region to define common electrode pattern portions, respective common electrode pattern portions and the pixel electrodes each forming an electric field; a first sensing line disposed on the common electrode and electrically connected with the common electrode to sense a user's touch; and at least one dummy electrode disposed in the dummy region adjacent one of the common electrode pattern portions.

20 Claims, 14 Drawing Sheets

LIQUID CRYSTAL DISPLAY DEVICE AND METHOD FOR MANUFACTURING THE SAME

CROSS REFERENCE TO RELATED APPLICATIONS

This application claims the benefit of the Korean Patent Application No. 10-2010-0116174 filed on Nov. 22, 2010, which is hereby incorporated by reference as if fully set forth herein.

BACKGROUND OF THE INVENTION

1. Field of the Invention

The present invention relates to a liquid crystal display (LCD) device, and more particularly, to an LCD device with a sensing electrode for sensing a user's touch.

2. Discussion of the Related Art

A liquid crystal display (LCD) device is widely applied in various fields, for example, notebook computers, monitors, spacecraft, and aircraft, due to advantageous properties, such as low driving voltage, low power consumption and portability. An LCD device includes a lower substrate, an upper substrate, and a liquid crystal layer disposed between the lower and upper substrates. According to whether or not an electric field is applied, an alignment of the liquid crystal layer is controlled so that light transmittance is controlled in the LCD device, thereby displaying images on the LCD device.

Typically, a mouse or keyboard is used as an input device for the LCD device. However, when the LCD device is applied to navigation, mobile terminals, and electric appliances, a touch screen has been recently used as a new input device instead of using a mouse or keyboard, wherein the touch screen enables a user to directly input information with finger or pen.

Hereinafter, a related art LCD device with a touch screen will be described in detail as follows. FIG. 1 is a cross section view illustrating a related art LCD device.

As shown in FIG. 1, the related art LCD device includes a liquid crystal panel 10 and a touch screen 20. The liquid crystal panel 10 displays images. Here, the liquid crystal panel 10 includes a lower substrate 12, an upper substrate 14, and a liquid crystal layer 16 formed between the lower and upper substrates 12 and 14. The touch screen 20 is formed on an upper surface of the liquid crystal panel 10, and the touch screen 20 is provided to sense a user's touch. The touch screen 20 includes a touch substrate 22, a first sensing electrode 24 formed on a lower surface of the touch substrate 22, and a second sensing electrode 26 formed on an upper surface of the touch substrate 22.

The first sensing electrode 24 is arranged in the horizontal direction on the lower surface of the touch substrate 22; and the second sensing electrode 26 is arranged in the vertical direction on the upper surface of the touch substrate 22. Thus, if the user touches a predetermined portion, capacitance between the first and second sensing electrodes 24 and 26 is changed at the touched portion. As such, the user's touching point is sensed by the change of the capacitance.

However, since the related art LCD device is formed with the touch screen 20 is additionally formed on the upper surface of the liquid crystal panel 10, the entire thickness is increased due to the touch screen 20, the manufacturing process is complicated, and the manufacturing cost is increased.

SUMMARY OF THE INVENTION

Accordingly, the present invention is directed to an LCD device and a method for manufacturing the same that substantially obviates one or more problems due to limitations and disadvantages of the related art.

An object of the present invention is to provide an LCD device in which a sensing electrode for sensing a user's touch is provided inside a liquid crystal panel. Thus, an additional touch screen on an upper surface of the liquid crystal panel is not needed, thereby decreasing the entire thickness, simplifying the manufacturing process, and lowering the manufacturing cost.

Additional features and advantages of the invention will be set forth in part in the description, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, an LCD device includes a substrate including an active region and a dummy region; gate and data lines disposed on the substrate crossing each other to define a plurality of pixel regions in the active region; a pixel electrode disposed in each of the plural pixel regions; a common electrode which is patterned in the active region to define common electrode pattern portions, respective common electrode pattern portions and the pixel electrodes each forming an electric field; a first sensing line disposed on the common electrode and electrically connected with the common electrode to sense a user's touch; and at least one dummy electrode disposed in the dummy region adjacent one of the common electrode pattern portions.

In another aspect, a method for manufacturing an LCD device includes sequentially depositing an electrode layer, a sensing line layer, and a photoresist layer on a substrate, the substrate including an active region and a dummy region; irradiating the photoresist layer with light through a halftone mask; forming a first photoresist pattern by developing the irradiated photoresist layer; etching the sensing line layer and the electrode layer using the photoresist pattern as a mask to form a common electrode pattern in the active region having common electrode pattern portions and to form at least one dummy electrode in the dummy region adjacent one of the common electrode pattern portions; partially removing the first photoresist pattern to form a second photoresist pattern; etching the sensing line layer using the second photoresist pattern as a mask to form a sensing line pattern having at least a first sensing line; and removing the second photoresist pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Hereinafter, an LCD device according to the present invention will be described with reference to the accompanying drawings.

Figure 1:
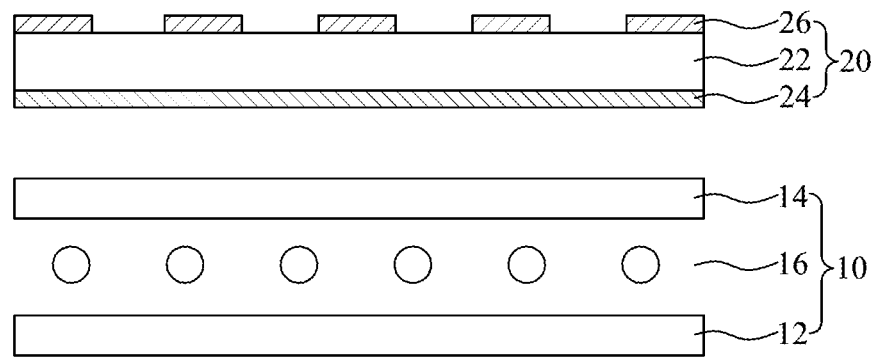
FIG. 1 is a cross sectional view illustrating a related art LCD device.
Figure 2A:
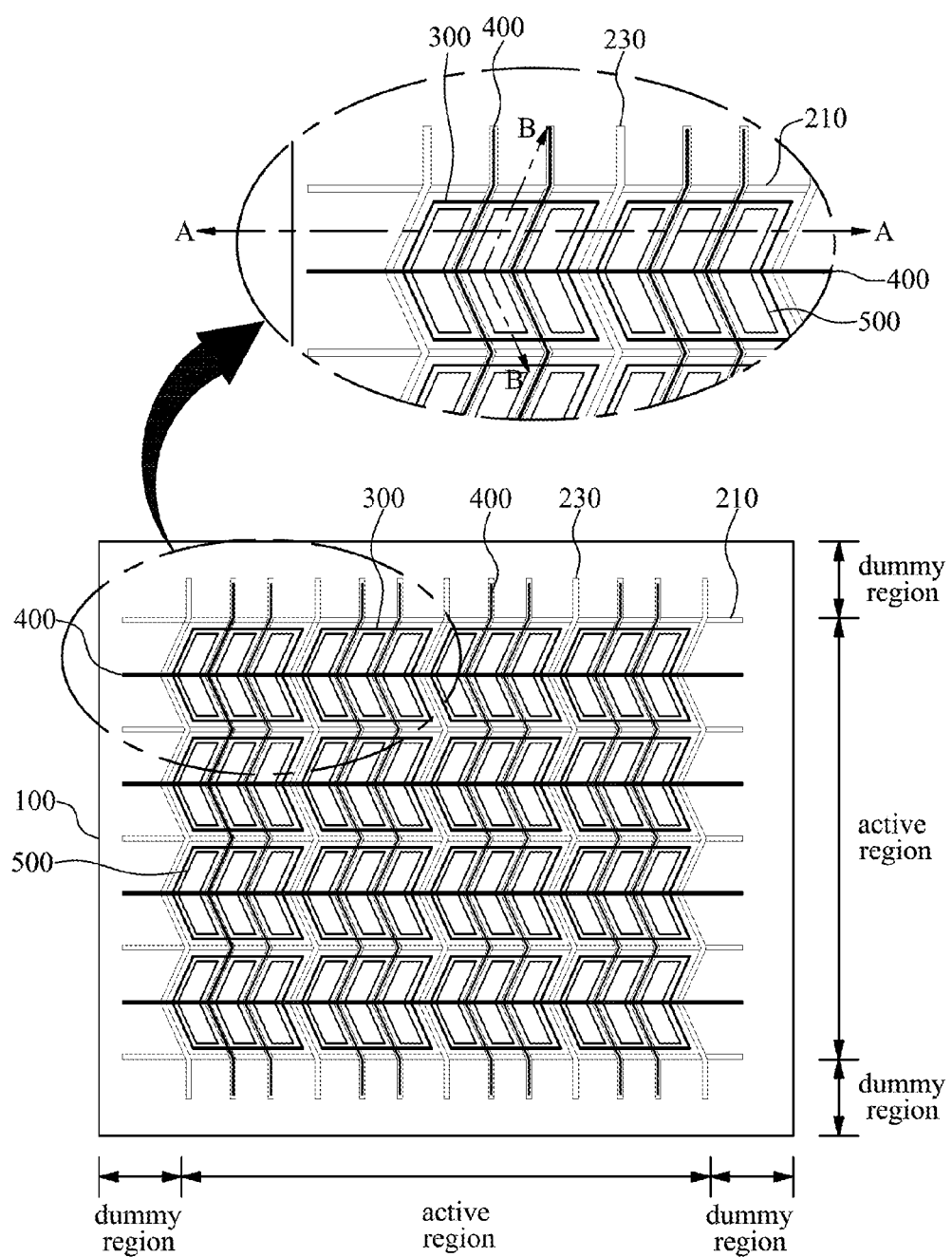
FIG. 2A is a plane view illustrating a lower substrate of an LCD device according to an exemplary embodiment of the present invention.
Figure 2B:
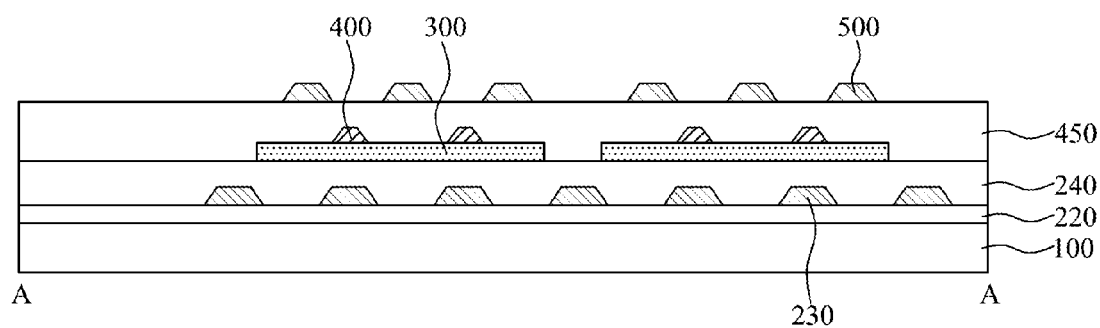
FIG. 2B is a cross sectional view along line A-A of FIG. 2A.
Figure 2C:
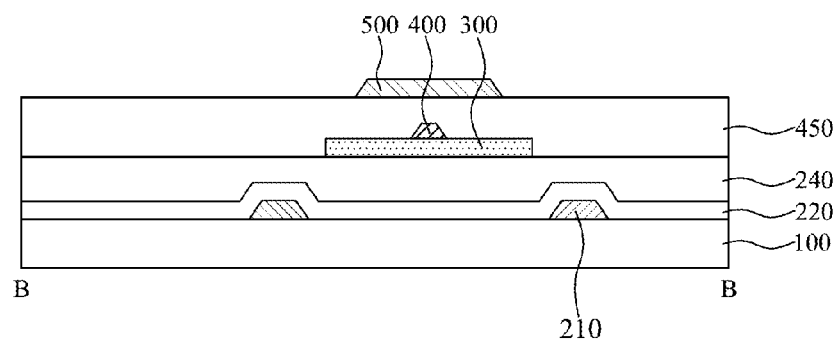
FIG. 2C is a cross sectional view along line B-B of FIG. 2A.

FIG. 2A is a plane view illustrating a lower substrate of an LCD device according to an exemplary embodiment of the present invention, FIG. 2B is a cross sectional view along line A-A of FIG. 2A, and FIG. 2C is a cross sectional view along line B-B of FIG. 2A. As shown in FIG. 2A, the LCD device according to an exemplary embodiment of the present invention includes a substrate 100, a gate line 210, a data line 230, a common electrode 300, a sensing line 400, and a pixel electrode 500. The substrate 100 may be formed of glass or transparent plastic. The gate line 210 is formed in the horizontal direction on the substrate 100, and the data line 230 is formed in the vertical direction on the substrate 100. A plurality of pixel regions are defined by the gate line 210 and the data line 230 crossing each other. The region where the plural pixel regions are formed is an active region on which an image is displayed, and the periphery around the active region is a dummy region in which an image is not displayed. Thus, the substrate 100 includes the active region, and the dummy region in the periphery around the active region. The gate line 210 is provided in a straight-line shape, and the data line 230 is formed in a bent shape, but not limited to that shape. For example, the data line 230 may be provided in a straight-line shape.

Although not shown, a thin film transistor is formed as a switching device for each of the pixel regions. The thin film transistor includes a gate electrode, a semiconductor layer, and source/drain electrodes. The thin film transistor may be formed in a bottom gate structure in which the gate electrode is positioned under the semiconductor layer, or a top gate structure in which the gate electrode is positioned above the semiconductor layer.

The common electrode 300 together with the pixel electrode 500 forms an electric field so as to drive liquid crystal. In addition, the common electrode 300 functions as a sensing electrode for sensing a user's touch. To use the common electrode 300 as the sensing electrode, the plural common electrodes 300 are provided in a predetermined pattern within the active region. Each of the plural common electrodes 300 may be formed in the size corresponding to one or more pixel regions. For example, as shown in the drawings, each common electrode 300 may be formed in the size corresponding to the three pixel regions.

The sensing line 400 electrically connects the plural common electrodes 300 with one another. That is, the individually-formed plural common electrodes 300 are connected with the sensing line 400, and a sensing circuit element is connected with an end of the sensing line 400, thereby sensing the user's touch. The sensing line 400 is arranged parallel to the data line 230, and also parallel to the gate line 210, thereby sensing the touched portion in the X-axis and Y-axis coordinates.

The sensing line 400 functions to reduce resistance of the common electrode 300 and to prevent disclination from occurring, which will be described as follows.

Typically, the common electrode 300 is formed of a transparent conductive material, such as indium tin oxide (ITO). The transparent conductive material is disadvantageous in that it has a large resistance. In this respect, the sensing line 400 formed of a metal material with good conductivity is connected with the common electrode 300 so that the resistance of the common electrode 300 is reduced.

As shown in FIG. 2A, if the data line 230 is formed in the bent shape, light leakage occurs in the bent portion of the data line 230, thereby causing disclination. Thus, the sensing line 400 arranged parallel to the gate line 210 is formed in the disclination-occurring portion, thereby preventing the disclination. The above sensing line 400 prevents the disclination from occurring. However, the aperture ratio caused by the sensing line 400 is decreased which should be prevented. Thus, the sensing line 400 arranged parallel to the data line 230 preferably overlaps the data line 230. If needed, the sensing line 400 overlapped with the gate line 210 may additionally be provided to reduce the resistance of the common electrode 300 while preventing the decrease of transmittance. The pixel electrode 500 is formed in each of the pixel regions. Especially, the shape of the pixel electrode 500 may correspond to the shape of the pixel region. As will be described with reference to FIG. 5A, at least one slit may be provided in the pixel electrode 500 to realize a fringe field switching mode LCD device.

The LCD device according to an exemplary embodiment of the present invention will be described in detail with reference to the cross section views of FIGS. 2B and 2C.

As shown in FIG. 2B, a gate insulating layer 220 is formed on the substrate 100; the data line 230 is patterned on the gate insulating layer 220, and a passivation layer 240 is formed on the data line 230. The common electrode 300 is patterned on the passivation layer 240, and the sensing line 400 is patterned on the common electrode 300. An insulating interlayer 450 is formed on the sensing line 400, and the pixel electrode 500 is patterned on the insulating interlayer 450.

As shown in FIG. 2C, the gate line 210 is patterned on the substrate 100, and the gate insulating layer 220 and passivation layer 240 are sequentially formed on the gate line 210. The common electrode 300 is patterned on the passivation layer 240, and the sensing line 400 is patterned on the common electrode 300. The insulating interlayer 450 is formed on the sensing line 400, and the pixel electrode 500 is patterned on the insulating interlayer 450.

The cross section shown in FIGS. 2B and 2C illustrates the thin film transistor of the bottom gate structure. If forming the thin film transistor of a top gate structure, an insulating layer may be additionally formed under the gate line 210 to insulate the semiconductor layer and the gate line 210 from each other.

When manufacturing the lower substrate of the LCD device, the common electrode 300 and the sensing line 400 may be respectively patterned with an individual mask, or may be simultaneously manufactured by a mask process using a halftone mask. For reducing the manufacturing cost and realizing the simplified manufacturing process, the halftone mask is used.

Hereinafter, a method for manufacturing the lower substrate of the LCD device, in which the common electrode 300 and sensing line 400 are patterned by a mask process using a halftone mask, will be described with reference to the accompanying drawings. FIGS. 3A to 3H are cross sectional views illustrating a method for manufacturing the lower substrate of the LCD device according to the exemplary embodiment of FIGS. 2A-2C.

Figure 3A:
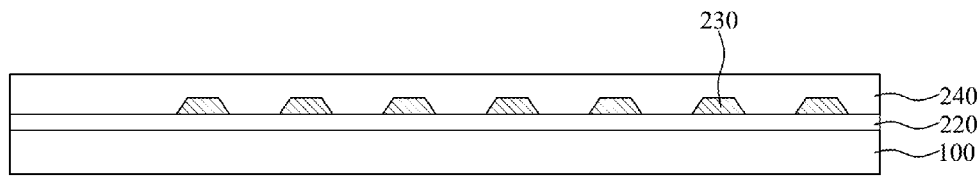
FIGS. 3A-3H are cross sectional views illustrating a method for manufacturing a lower substrate of an LCD device according to the exemplary embodiment of FIGS. 2A-2C.
Figure 3B:
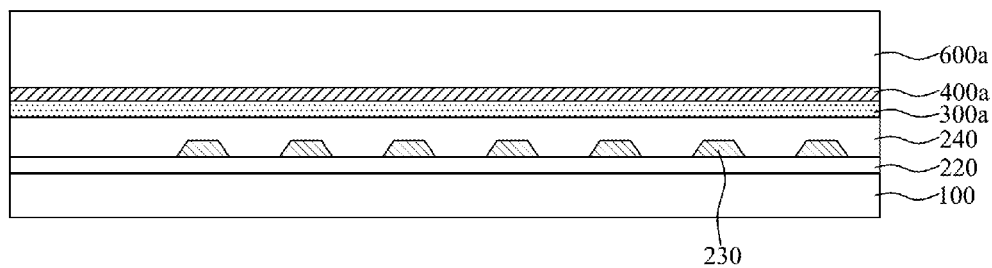

First, as shown in FIG. 3A, the gate insulating layer 220, the data line 230, and the passivation layer 240 are sequentially formed on the substrate 100. Although not shown, the gate line 210 is formed on the substrate 100 before forming the gate insulating layer 220. As shown in FIG. 3B, an electrode layer 300a, a sensing line layer 400a, and a photoresist layer 600a are sequentially formed on the passivation layer 240.

Figure 3C:
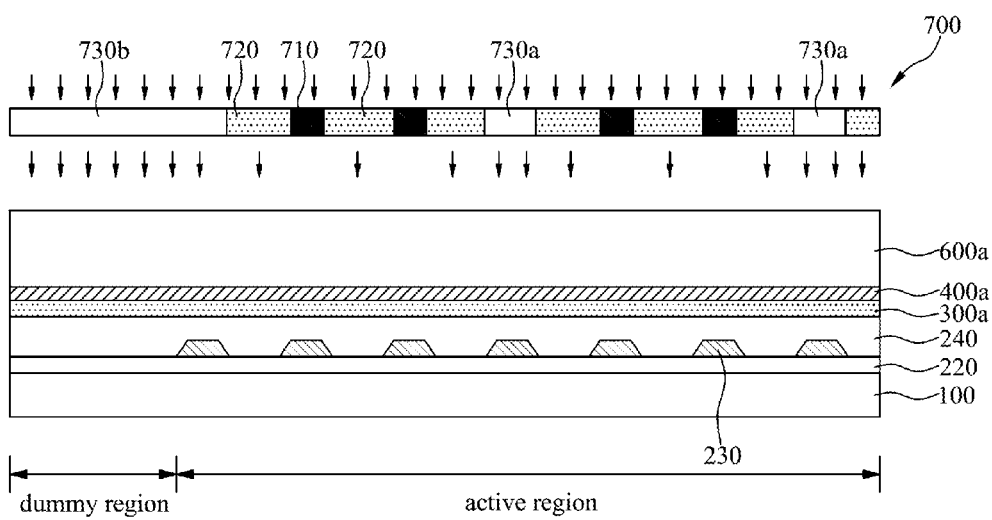

As shown in FIG. 3C, the photoresist layer 600a is irradiated with light by the use of halftone mask 700. The halftone mask 700 includes a non-transmission region 710 through which light does not transmit, a semi-transmission region 720 through which light partially transmits, and transmission regions 730a and 730b through which light totally transmits.

Figure 3D:
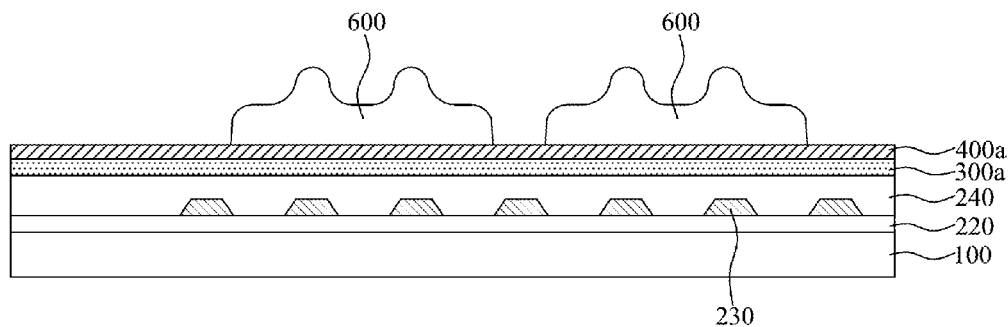

As shown in FIG. 3D, a photoresist pattern 600 is formed by developing the photoresist layer 600a irradiated with light. By developing the photoresist layer 600a, the photoresist layer corresponding to the non-transmission region 710 of the halftone mask 700 remains as it is, the photoresist layer corresponding to the semi-transmission region 720 of the halftone mask 700 is partially removed, and the photoresist layer corresponding to the transmission regions 730a and 730b of the halftone mask 700 is completely removed.

Figure 3E:
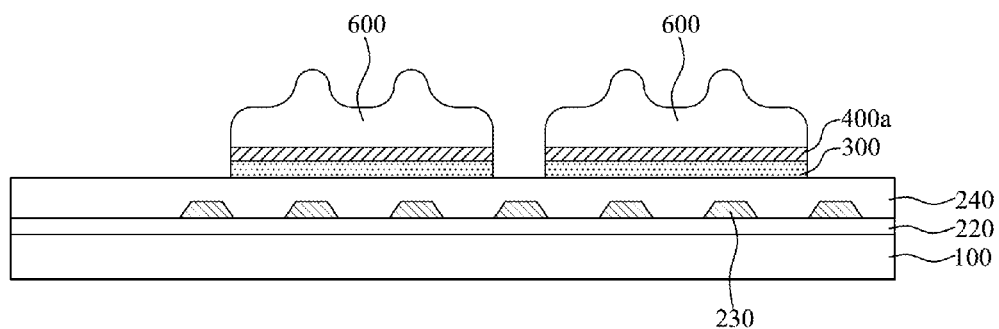

As shown in FIG. 3E, the electrode layer 300a and the sensing line layer 400a are etched under the condition that the photoresist pattern 600 is used as a mask. Here, the common electrode 300 is patterned by etching the electrode layer 300a.

Figure 3F:
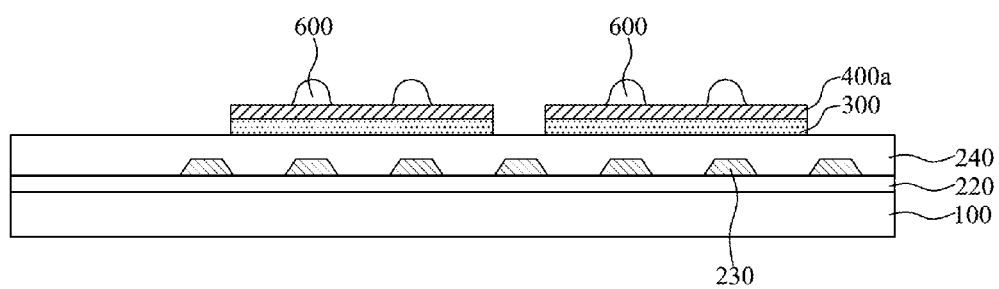

As shown in FIG. 3F, the photoresist pattern 600 is ashed so that the photoresist pattern 600 is decreased in width and height.

Figure 3G:
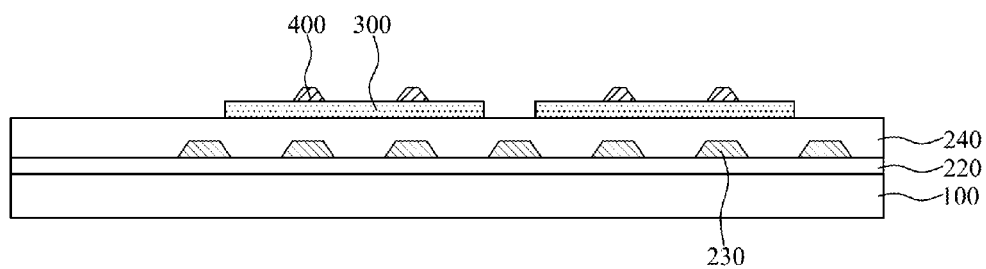

As shown in FIG. 3G, the sensing line layer 400a is additionally etched under the condition that the ashed photoresist pattern 600 is used as a mask, and then the photoresist pattern 600 is removed.

At this time, the sensing line 400 is patterned by additionally etching the sensing line layer 400a.

Figure 3H:
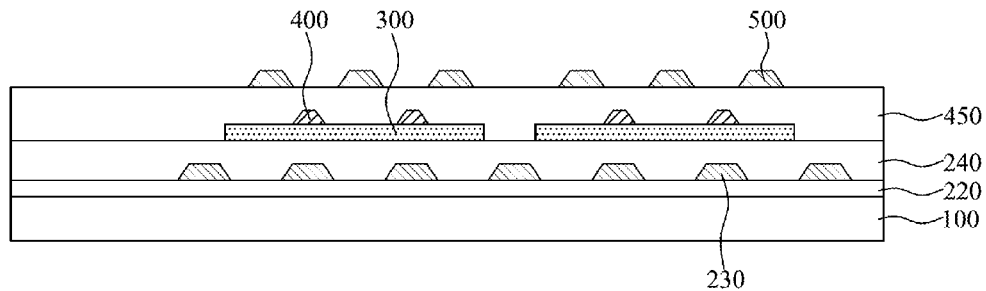

As shown in FIG. 3H, the insulating interlayer 450 is formed on the sensing line 400, and the pixel electrode 500 is formed on the insulating interlayer 450.

Through the use of a halftone mask, the common electrode 300 and the sensing line 400 are patterned simultaneously by a process using one mask, thereby simplifying the manufacturing process and decreasing the manufacturing cost.

However, when carrying out the exposing process using the above halftone mask, it might be difficult to obtain the desired photoresist pattern due to the overexposure in a specific region. Thus, the common electrode 300 of the specific region might be patterned in an undesired shape as will be explained in detail as follows.

Figure 4A:
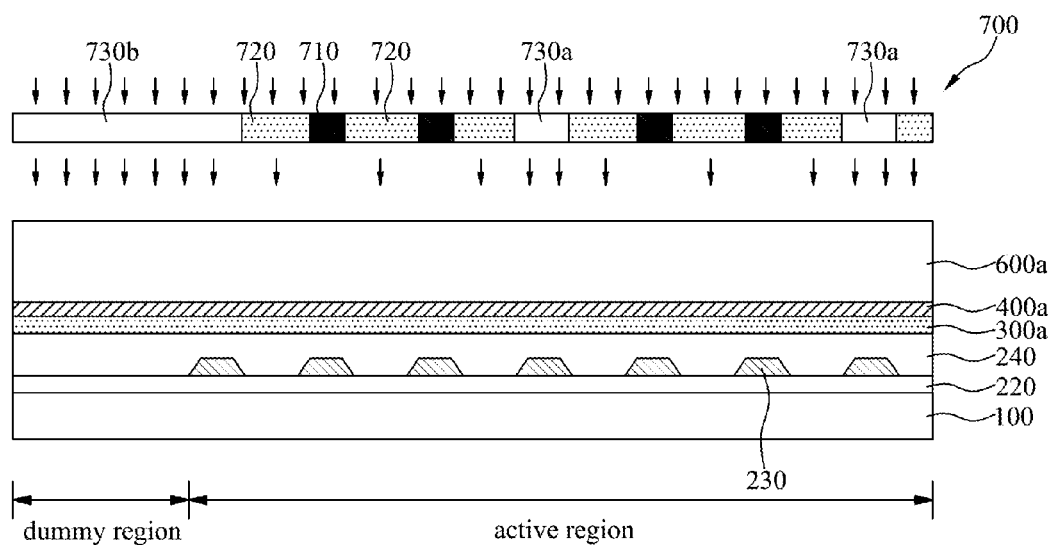
FIGS. 4A-4C are cross sectional views illustrating a common electrode patterned in a undesired shape by an overexposure occurred in an exposing process using a halftone mask.
Figure 4B:
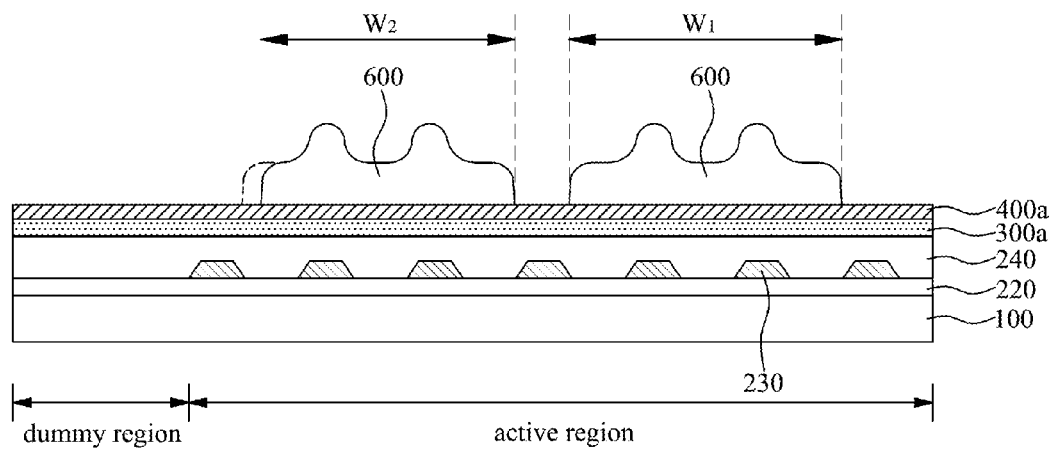
Figure 4C:
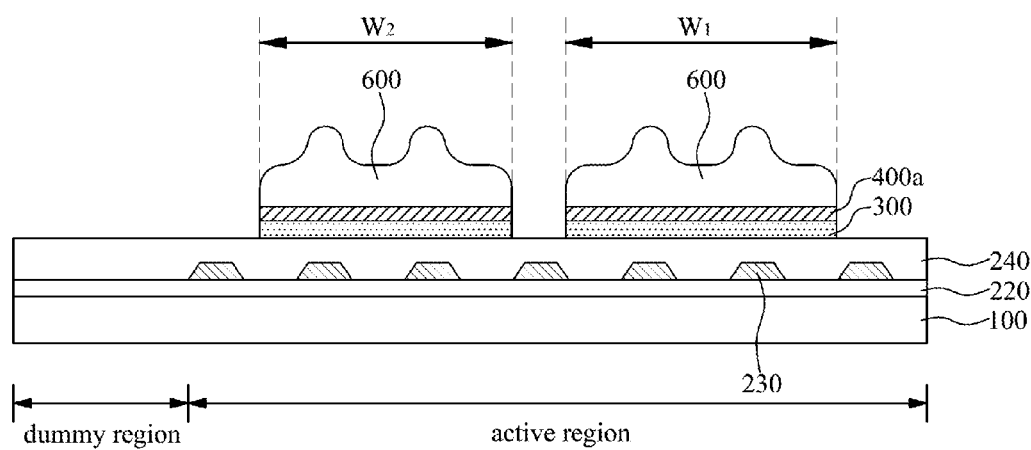

FIGS. 4A to 4C are cross sectional views illustrating the common electrode patterned in the undesired shape by the overexposure occurred in the exposing process using the halftone mask, which correspond to the above FIGS. 3C to 3E. Thus, the same reference numbers will be used throughout the drawings to refer to the same or like parts.

As shown in FIG. 4A, the photoresist layer 600a is irradiated with light by the use of halftone mask 700. The halftone mask 700 includes the non-transmission region 710 through which light does not transmit, the semi-transmission region 720 through which light partially transmits partially, and the transmission regions 730a and 730b through which light totally transmits.

The transmission regions 730a and 730b include the first transmission region 730a and the second transmission region 730b. The first transmission region 730a corresponds to the active region, and the second transmission region 730b corresponds to the dummy region. In the transmission regions 730a and 730b, the photoresist layer, the electrode layer 300a and the sensing line layer 400a are removed completely. As a result, the first transmission region 730a corresponds to the region between the patterns of the common electrode 300 within the active region, and the second transmission region 730b corresponds to the dummy region where the common electrode 300 is removed completely. Thus, a width of the first transmission region 730a is very narrow, and a width of the second transmission region 730b is very wide.

Due to the large width of the second transmission region 730b, overexposure may occur in the semi-transmission region 720 being in contact with the second transmission region 730b for the exposing process. The overexposure appears to occur by light diffraction.

On assumption that the overexposure occurs in the semi-transmission region 720, as shown in FIG. 4B, when the photoresist layer is patterned by the development process, the photoresist layer corresponding to the overexposed semi-transmission region 720 is removed partially (the region marked by the dotted line).

Thus, the width (W2) of the photoresist pattern 600 in the outermost region being in contact with the dummy region is smaller than the width (W1) of the other photoresist pattern 600. If the electrode layer 300a and the sensing line layer 400a are etched under the condition that the above-shaped photoresist pattern 600 is used as a mask, as shown in FIG. 4C, the width (W2) of the common electrode 300 in the outermost region being in contact with the dummy region is smaller than the width (W1) of the other common electrode 300. As a result, the pattern of the common electrode 300 in the outermost region being in contact with the dummy region is partially lost, which may cause an uneven driving of liquid crystal therein.

To overcome the above problem related with the partial loss in the pattern of the common electrode 300 of the outermost region being in contact with the dummy region, a lower substrate of an LCD device according to another embodiment of the present invention will be described as follows.

Figure 5A:
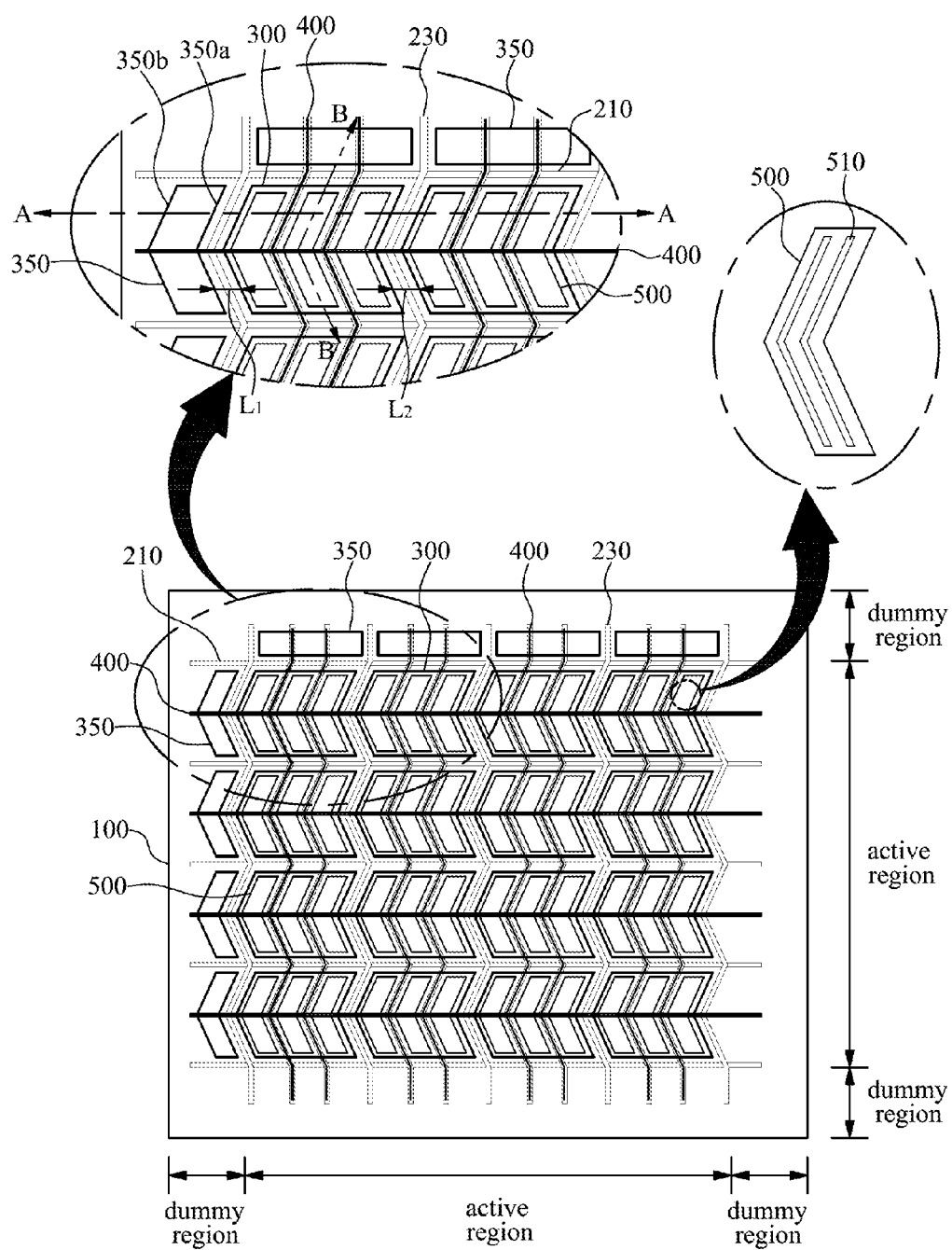
FIG. 5A is a plane view illustrating a lower substrate of an LCD device according to another exemplary embodiment of the present invention.
Figure 5B:
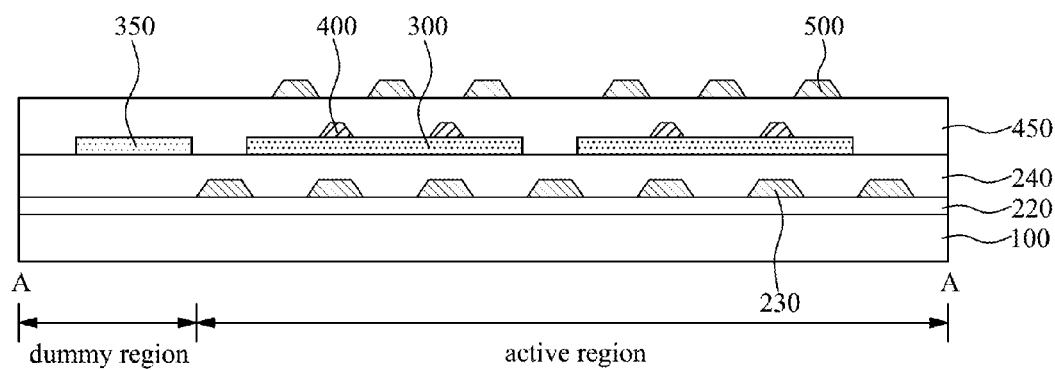
FIG. 5B is a cross sectional view along line A-A of FIG. 5A.
Figure 5C:
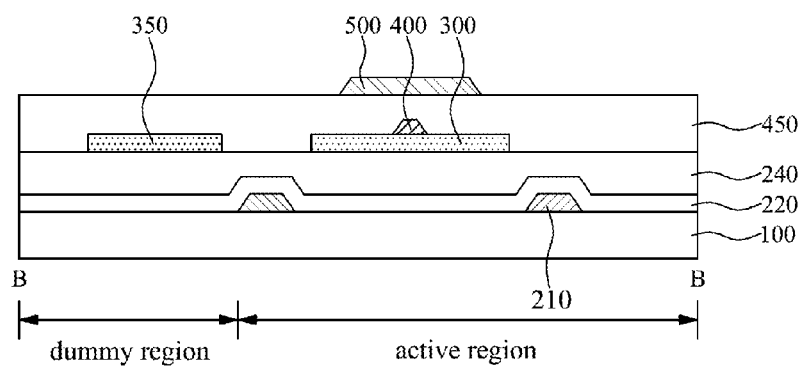
FIG. 5C is a cross sectional view along line B-B of FIG. 5A.

FIG. 5A is a plane view illustrating a lower substrate of an LCD device according to another exemplary embodiment, FIG. 5B is a cross sectional view along line A-A of FIG. 5A, and FIG. 5C is a cross sectional view along line B-B of FIG. 5A. Except that a dummy electrode is additionally formed in a dummy region, the lower substrate according to the exemplary embodiment of FIGS. 5A to 5C is substantially the same as the lower substrate according to the exemplary embodiment of FIGS. 2A to 2C. Thus, the same reference numbers will be used throughout the drawings to refer to the same or like parts, and a detailed explanation for the same parts will be omitted.

As shown in FIG. 5A, the LCD device according to another exemplary embodiment includes a substrate 100, a gate line 210, a data line 230, a common electrode 300, a dummy electrode 350, a sensing line 400, and a pixel electrode 500. A plurality of pixel regions are defined by the gate line 210 and the data line 230 crossing each other. At a crossing portion of the gate and data lines 210 and 230, a thin film transistor is formed as a switching device, where the thin film transistor may be formed in a bottom gate structure or top gate structure. The common electrode 300 is patterned at the size corresponding to one or more pixel regions. Also, the respective common electrodes 300 are provided at fixed intervals. The dummy electrode 350 is formed in a dummy region corresponding to the periphery of an active region. Specifically, the dummy electrode 350 neighbors the outermost common electrode 300 of the active region such that the dummy electrode 350 prevents the pattern of the common electrode 300 in the outermost region from being partially lost. The dummy electrode 350 is formed simultaneously with the common electrode 300 by a halftone mask process to prevent the pattern of the common electrode 300 in the outermost region from being partially lost. Thus, the dummy electrode 350 may be provided at the same layer as the common electrode 300, and may be formed of the same material as the common electrode 300. However, the dummy electrode 350 does not perform the function of the common electrode 300, that is, driving liquid crystal, and the function of a sensing electrode.

The dummy electrode 350 may be formed in the dummy region where a width of a transmission region in a halftone mask is reduced by an interval between the dummy electrode 350 and the common electrode 300 of the outermost region. Thus, an overexposure does not occur in a semi-transmission region being in contact with the transmission region for an exposing process so that the pattern of the outermost common electrode 300 is prevented from being partially lost. This will be readily understood with reference to the process for manufacturing the lower substrate of the LCD device.

The interval (L1) between the dummy electrode 350 and the common electrode 300 of the outermost region is determined within a range to prevent the pattern of the outermost common electrode 300 from being partially lost. Preferably, the interval (L1) between the dummy electrode 350 and the common electrode 300 of the outermost region is the same as an interval (L2) between the patterns of the common electrode 300.

Also, it is not necessary that the shape of the dummy electrode 350 be the same as the shape of the common electrode 300. However, the side 350a of the dummy electrode 350, which neighbors the common electrode 300, may be provided parallel to the side of the common electrode 300. For example, when the dummy electrode 350 is provided at the left side of the common electrode 300 in the outermost region, the right side 350a which neighbors to the common electrode 300 is bent while being in parallel with the common electrode 300. However, the left side 350b which does not neighbor the common electrode 300 may be formed in various shapes such as straight line instead of the bent shape. For example, the dummy electrode 350 may be provided in at least one of the four dummy regions. That is, the left dummy region, the right dummy region, the upper dummy region, and the lower dummy region with respect to the active region. In the accompanying drawings, the dummy electrodes 350 are provided in the left dummy region and the upper dummy region, but not limited to that.

For electrically connecting the plural common electrodes 300 with one another, the sensing line 400 is formed on the common electrode 300. Also, the sensing line 400 is formed on the dummy electrode 350 as well as the common electrode 300. The sensing line 400 may be respectively arranged in parallel with the data line 230, and arranged in parallel with the gate line 210, to thereby sense the touched portion in the X-axis and Y-axis coordinates.

The sensing line 400 arranged parallel to the gate line 210 may be formed in the disclination-occurring region, and the sensing line 400 arranged in parallel with the data line 230 may be overlapped with the data line 230.

The pixel electrode 500 is formed in each pixel of the active region. The pixel electrode 500 is not formed in the dummy region so that liquid crystal is not driven between the dummy electrode 350 and the pixel electrode 500. The pixel electrode 500 is formed in the shape corresponding to the pixel region. At least one slit 510 may be provided in the pixel electrode 500. If the pixel electrode 500 includes the slit 510 therein, a fringe field is formed above the slit 510 between the pixel electrode 500 and the common electrode 300. As such, the liquid crystal is driven by the fringe field, thereby realizing a fringe field switching mode LCD device.

Hereinafter, the LCD device of FIG. 5A will be further described with reference to the cross sectional views of FIGS. 5B and 5C.

As shown in FIG. 5B, a gate insulating layer 220 is formed on the substrate 100, the data line 230 is patterned on the gate insulating layer 220, and a passivation layer 240 is formed on the data line 230. The common electrode 300 and the dummy electrode 350 are patterned on the passivation layer 240. The common electrode 300 is formed in the active region, and the dummy electrode 350 is formed in the dummy region. The sensing line 400 is patterned on the common electrode 300; an insulating interlayer 450 is formed on the sensing line 400; and the pixel electrode 500 is patterned on the insulating interlayer 450. Since the pixel electrode 500 is formed only in the active region, the pixel electrode 500 is not formed above the dummy electrode 350, but is formed above the common electrode 300.

As shown in FIG. 5C, the gate line 210 is patterned on the substrate 100, and the gate insulating layer 220 and the passivation layer 240 are sequentially formed on the gate line 210. The common electrode 300 and the dummy electrode 350 are patterned on the passivation layer 240, and the sensing line 400 is patterned on the common electrode 300. The insulating interlayer 450 is formed on the sensing line 400, and the pixel electrode 500 is patterned on the insulating interlayer 450.

The cross section shown in FIGS. 5B and 5C illustrates the thin film transistor of the bottom gate structure. If forming the thin film transistor of the top gate structure, an insulating layer may be additionally formed under the gate line 210 to insulate the semiconductor layer and the gate line 210 from each other.

Hereinafter, a method for manufacturing the lower substrate of the LCD device according to FIG. 5A-5C will be described with reference to the accompanying drawings. FIGS. 6A-6H are cross sectional views illustrating a method for manufacturing the lower substrate of the LCD device corresponding to the cross section along line A-A of FIG. 5A.

Figure 6A:
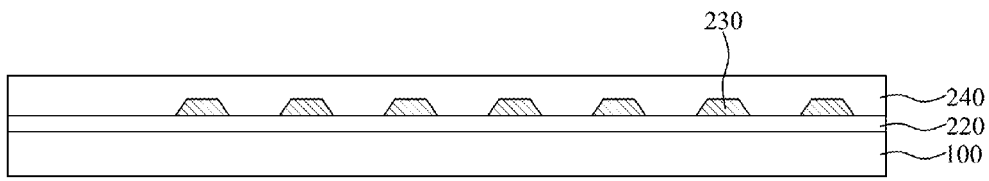
FIGS. 6A-6H are cross sectional views illustrating a method for manufacturing a lower substrate of an LCD device of FIGS. 5A-5C.
Figure 6B:
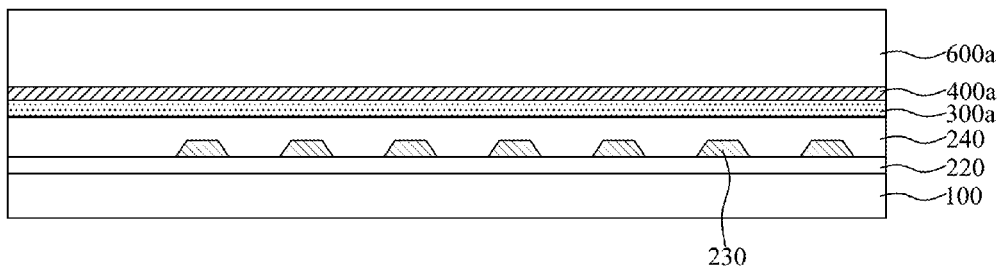

First, as shown in FIG. 6A, the gate insulating layer 220, the data line 230, and the passivation layer 240 are sequentially formed on the substrate 100. Although not shown, the gate line 210 is formed on the substrate 100 before forming the gate insulating layer 220. As shown in FIG. 6B, an electrode layer 300a, a sensing line layer 400a, and a photoresist layer 600a are sequentially formed on the passivation layer 240.

Figure 6C:
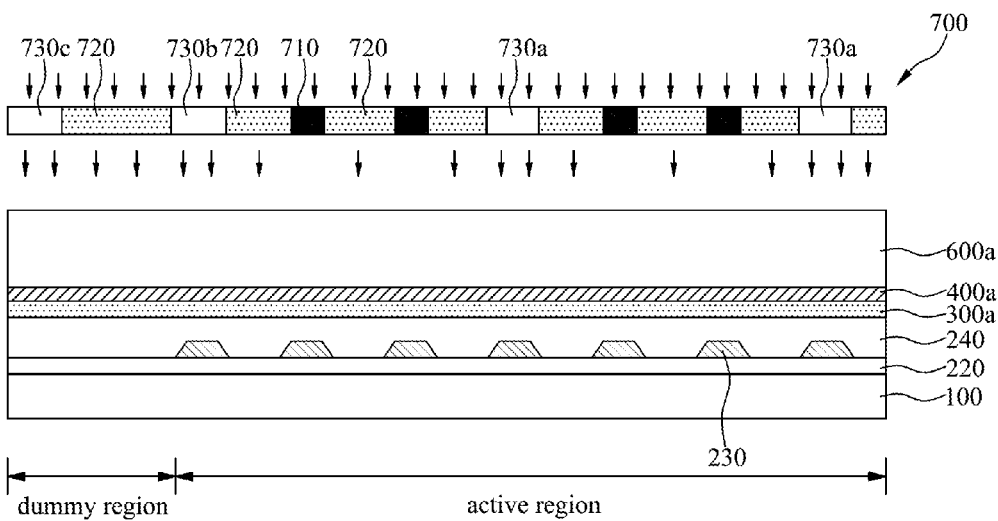

As shown in FIG. 6C, the photoresist layer 600a is irradiated with light using a halftone mask 700. The halftone mask 700 includes a non-transmission region 710 through which light does not transmit, a semi-transmission region 720 through which light partially transmits; and transmission regions 730a, 730b, and 730c through which light totally transmits. Here, the transmission regions 730a, 730b, and 730c include the first transmission region 730a corresponding to the active region, the second transmission region 730b corresponding to the interface between the active region and the dummy region, and the third transmission region 730c corresponding to the dummy region. A width of the second transmission region 730b is identical to a width of the first transmission region 730a. Since the width of the second transmission region 730b is not large, the overexposure does not occur in the semi-transmission region 720 being in contact with the second transmission region 730b in an exposing process to be explained. Thus, the loss of the pattern of the outermost common electrode can be prevented.

It is possible to form the third transmission region 730c with a relatively large width. That is, even though the overexposure occurs in the semi-transmission region 720 being in contact with the third transmission region 730c in the following exposing process due to the large width of the third transmission region 730c, the semi-transmission region 720 being in contact with the third transmission region 730c finally corresponds to the dummy region. Thus, the partial pattern loss of the dummy electrode is irrelevant to the liquid crystal driving.

Figure 6D:
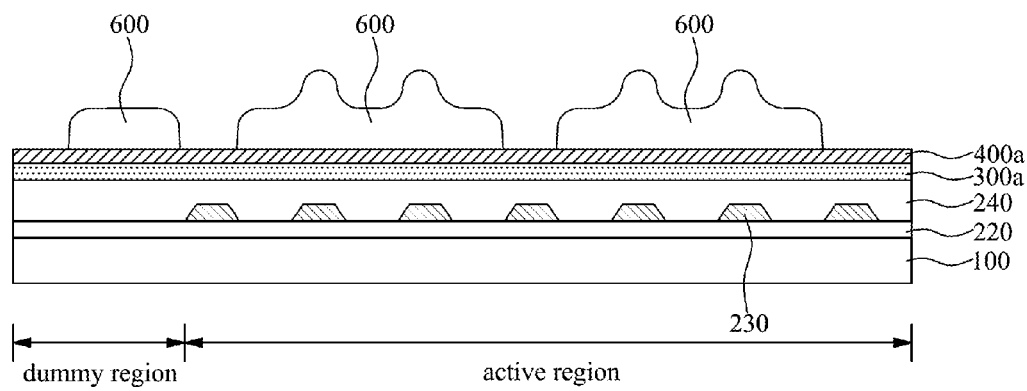

As shown in FIG. 6D, a photoresist pattern 600 is formed by developing the photoresist layer 600a irradiated with light. By developing the photoresist layer 600a, the photoresist layer corresponding to the non-transmission region 710 of the halftone mask 700 remains, the photoresist layer corresponding to the semi-transmission region 720 of the halftone mask 700 is partially removed, and the photoresist layer corresponding to the transmission region 730a, 730b and 730c of the halftone mask 700 is totally removed. Since the overexposure does not occur in the semi-transmission region 720 being in contact with the second transmission region 730b for the above process, the photoresist pattern 600 of the active region is formed in the desired shape by the developing process.

Figure 6E:
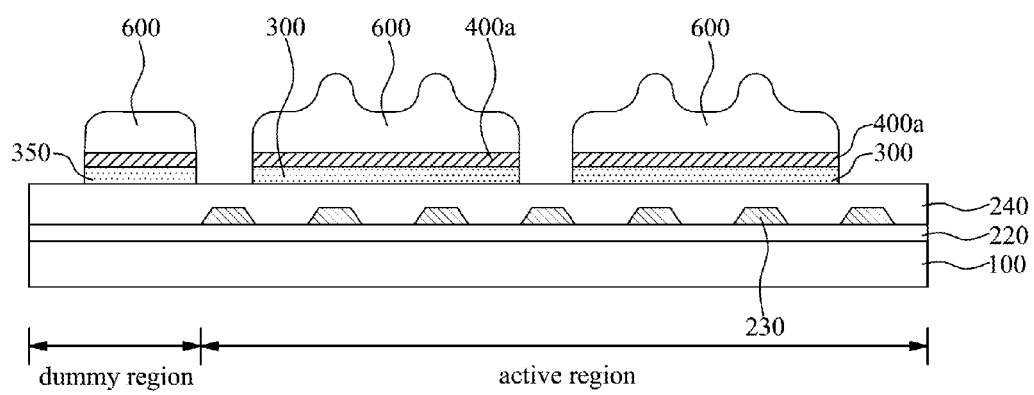

As shown in FIG. 6E, the electrode layer 300a and the sensing line layer 400a are etched under the condition that the photoresist pattern 600 is used as a mask. Here, the common electrode 300 is patterned in the active region, and the dummy electrode 350 is patterned in the dummy region by etching the electrode layer 300a. Here, the photoresist pattern 600 of the active region is formed in the desired shape so that the common electrode 300 is formed in the desired pattern by the etching process.

Figure 6F:
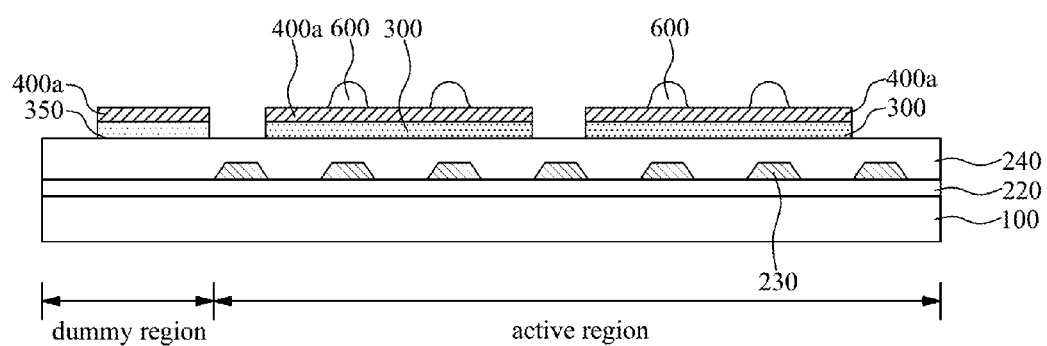

As shown in FIG. 6F, the photoresist pattern 600 is ashed so that the photoresist pattern 600 is decreased in width and height.

Figure 6G:
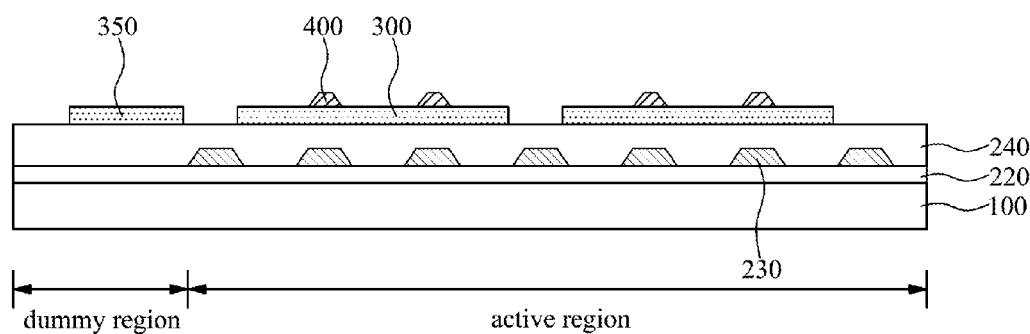

As shown in FIG. 6G, the sensing line layer 400a is additionally etched under the condition that the ashed photoresist pattern 600 is used as a mask, and then the photoresist pattern 600 is removed. Here, the sensing line 400 is patterned on the common electrode 300 by additionally etching the sensing line layer 400a.

Although not shown here, the sensing line 400 may be patterned on the dummy electrode 350. (See FIG. 5A.)

Figure 6H:
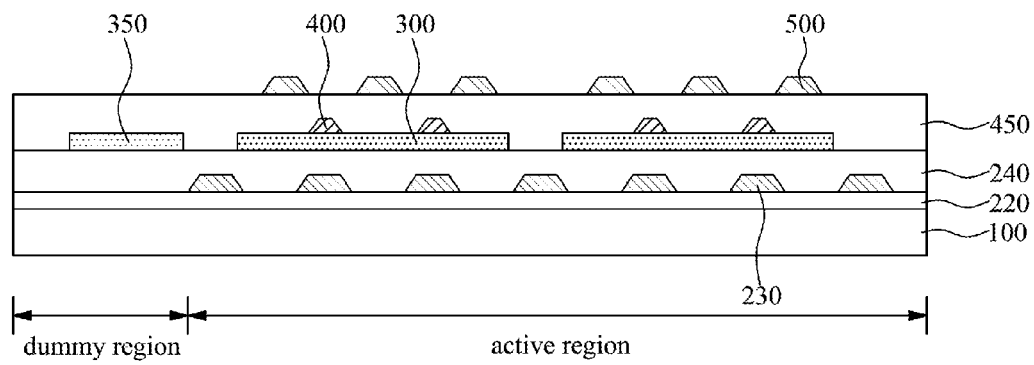

As shown in FIG. 6H, the insulating interlayer 450 is formed on the sensing line 400, and the pixel electrode 500 is formed on the insulating interlayer 450.

Figure 7:
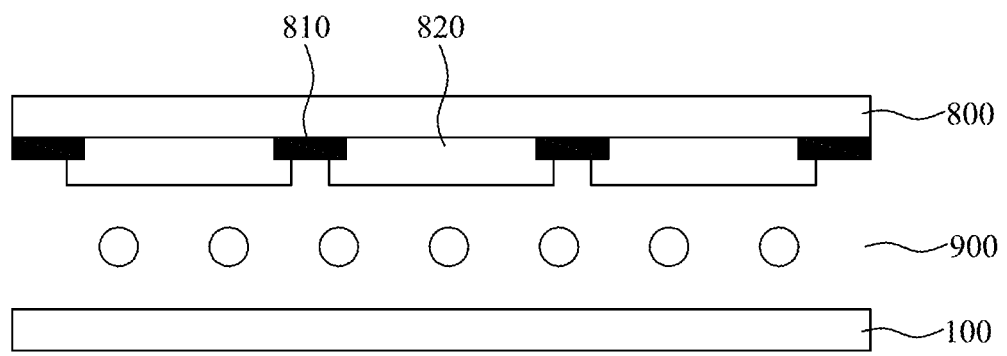
FIG. 7 is a liquid crystal display device of the present invention.

For the above description of the LCD device according to the present invention, the lower substrate has been explained. FIG. 7 shows a completed a liquid crystal display device according to the present invention. In the completed liquid crystal device, the lower substrate 100 is joined with an upper substrate 800 with a liquid crystal layer 900 therebetween. The upper substrate 800 may include a light-shielding layer 810, such as a black matrix layer, to prevent light leakage in other regions except the pixel region; red(R), green(G), and blue(B) color filter layers 820 respectively formed between each light-shielding layer; and an overcoat layer which is formed on the color filter layers.

The above description illustrates exemplary processes for manufacturing the lower substrate of the LCD device according to the present invention. The LCD device of the present invention may be manufactured by forming the lower substrate through the above process; forming the upper substrate by sequentially forming the light-shielding layer, color filter layer, and overcoat layer; and forming the liquid crystal layer between the lower and upper substrates. The process for forming the liquid crystal layer between the lower and upper substrates may be carried out by a liquid crystal injection method or liquid crystal dispensing method which is generally known to those skilled in the art.

Accordingly, the common electrode is used for forming the electric field to drive the liquid crystal, and furthermore used as the sensing electrode for sensing the user's touch. Unlike the related art, the LCD device according to the present invention does not need an additional touch screen on the liquid crystal panel, so that the LCD device is thinner and manufactured using a simplified process with decreased cost.

Also, the dummy electrode is additionally formed in the dummy region corresponding to the periphery of the active region so that it is possible to prevent loss of the pattern of the outermost common electrode in the active region when the common electrode and the sensing line are patterned by the use of halftone mask.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD device, comprising:
a substrate including an active region and a dummy region;
gate and data lines disposed on the substrate crossing each other to define a plurality of pixel regions in the active region;
a pixel electrode disposed in each of the plural pixel regions;
a common electrode which is patterned in the active region to define common electrode pattern portions, respective common electrode pattern portions and the pixel electrodes each forming an electric field;
a first sensing line disposed on the common electrode and electrically connected with the common electrode to sense a user's touch; and
at least one dummy electrode disposed in the dummy region adjacent one of the common electrode pattern portions.

2. The LCD device of claim 1, wherein the dummy electrode and the common electrode are formed of a same material.

3. The LCD device of claim 1, wherein the dummy electrode and the common electrode are formed in the same layer.

4. The LCD device of claim 1, wherein a distance in a first direction between the dummy electrode and an adjacent one of the common electrode pattern portions is substantially the same as a distance in the first direction between neighboring common electrode pattern portions.

5. The LCD device of claim 1, wherein a fringe field effect is used.

6. The LCD device of claim 1, wherein the common electrode pattern portions each have a bent shape.

7. The LCD device of claim 6, wherein the first sensing line is disposed at the bent portion of the common electrode pattern portions to prevent disclination.

8. The LCD device of claim 1, wherein a side of the dummy electrode toward the adjacent one of the common electrode pattern portions is parallel to a proximal side of the adjacent one of common electrode pattern portions.

9. The LCD device of claim 8, wherein a shape of a side of the dummy electrode away from the adjacent one of the common electrode pattern portion is different from a shape of the side of the dummy electrode toward the adjacent one of the common electrode pattern portion.

10. The LCD device of claim 8, wherein the first sensing line is further disposed on the dummy electrode.

11. The LCD device of claim 1, further comprising a second sensing line disposed over the data line and crossing over the first sensing line, the first sensing line and the second sensing line for sensing a touch position.

12. A method for manufacturing an LCD device, comprising:
sequentially depositing an electrode layer, a sensing line layer, and a photoresist layer on a substrate, the substrate including an active region and a dummy region;
irradiating the photoresist layer with light through a halftone mask;
forming a first photoresist pattern by developing the irradiated photoresist layer;
etching the sensing line layer and the electrode layer using the photoresist pattern as a mask to form a common electrode pattern in the active region having common electrode pattern portions and to form at least one dummy electrode in the dummy region adjacent one of the common electrode pattern portions;
partially removing the first photoresist pattern to form a second photoresist pattern;
etching the sensing line layer using the second photoresist pattern as a mask to form a sensing line pattern having at least a first sensing line; and
removing the second photoresist pattern.

13. The method of claim 12, wherein the half tone mask includes a non-transmission region through which light does not transmit, a semi-transmission region through which light partially transmits partially, and transmission regions through which light totally transmits,
wherein the transmission region includes a first transmission region corresponding to the active region and a second transmission region corresponding the an interface between the active region and the dummy region, and
wherein a width of the first transmission region is substantially the same as a width of the second transmission region.

14. The method of claim 12, wherein a distance in a first direction between the dummy electrode and the adjacent one of the common electrode pattern portions is substantially the same as a distance in the first direction between neighboring common electrode pattern portions.

15. The method of claim 12, wherein the common electrode pattern portions each have a bent shape.

16. The method of claim 15, wherein the first sensing line is disposed at the bent portion of the common electrode pattern portions to prevent disclination.

17. The method of claim 12, wherein a side of the dummy electrode toward the adjacent one of the common electrode pattern portions is parallel to a proximal side of the adjacent one of common electrode pattern portions.

18. The method of claim 17, wherein a shape of a side of the dummy electrode away from the adjacent one of the common electrode pattern portion is different from a shape of the side of the dummy electrode toward the adjacent one of the common electrode pattern portion.

19. The method of claim 17, wherein the first sensing line is further disposed on the dummy electrode.

20. The method of claim 12, further comprising forming gate and data lines disposed on the substrate crossing each other to define a plurality of pixel regions in the active region, and
wherein the sensing line pattern further comprises a second sensing line disposed over the data line and crossing over the first sensing line, the first sensing line and the second sensing line for sensing a touch position.

* * * * *